(12) United States Patent
Fricke (10) Patent No.: US 11,738,824 B1
(45) Date of Patent: Aug. 29, 2023

(54) BICYCLE TRAILERS

(71) Applicant: Tyler Fricke, Gilbert, AZ (US)

(72) Inventor: Tyler Fricke, Gilbert, AZ (US)

(*) Notice: Subject to any disclaimer, the term of this patent is extended or adjusted under 35 U.S.C. 154(b) by 145 days.

(21) Appl. No.: 17/165,711

(22) Filed: Feb. 2, 2021

Related U.S. Application Data

(62) Division of application No. 16/118,153, filed on Aug. 30, 2018, now Pat. No. 10,940,912.

(51) Int. Cl.
*B62K 27/00* (2006.01)

(52) U.S. Cl.
CPC .................. *B62K 27/003* (2013.01)

(58) Field of Classification Search
CPC ........................... B62K 27/003; B62B 7/126
See application file for complete search history.

(56) References Cited

U.S. PATENT DOCUMENTS

| | | |
|---|---|---|
| 3,829,125 A | 8/1974 | Davis |
| 4,229,018 A | 10/1980 | Chika |
| 4,729,574 A | 3/1988 | Tipke |
| 5,123,668 A | 6/1992 | Ligas |
| 5,261,683 A | 11/1993 | Kurdziel |
| 5,427,396 A * | 6/1995 | Gore ............... B62D 63/067 280/503 |
| 5,785,333 A | 7/1998 | Hinkston |
| 6,182,990 B1 | 2/2001 | Everett |
| 6,409,194 B1 * | 6/2002 | Voas ............... B62K 27/003 280/204 |
| 6,634,701 B2 | 10/2003 | Votruba |
| 8,444,222 B2 * | 5/2013 | Buckingham ...... B60N 2/2806 297/256.16 |
| 8,636,094 B1 | 1/2014 | Conner |
| D698,700 S | 2/2014 | Dempsey |
| 8,950,767 B2 | 2/2015 | Carter |
| 8,967,651 B1 | 3/2015 | Simic |
| D887,905 S | 6/2020 | Fricke |
| 2014/0216352 A1 | 8/2014 | Carter |

FOREIGN PATENT DOCUMENTS

| | | | | |
|---|---|---|---|---|
| CN | 110432596 A | * | 11/2019 | |
| DE | 9215797 U1 | * | 3/1993 | |
| DE | 202007009450 U1 | * | 11/2007 | ............. B62B 7/142 |
| DE | 202019003584 U1 | * | 10/2019 | |
| EP | 3895967 A1 | * | 10/2021 | |
| EP | 3895969 A1 | * | 10/2021 | |

OTHER PUBLICATIONS

Fricke, T., Bicycle Trailer, Aug. 2014, 1 page.

* cited by examiner

*Primary Examiner* — Kevin Hurley
(74) *Attorney, Agent, or Firm* — IPTechLaw (57) ABSTRACT

Implementations of bicycle trailers may include a first end and a second end, the second end opposite the first end, a first plurality of latches coupled to the first end, and a second plurality of latches coupled to the second end. The first plurality of latches may be configured to secure a rear-facing child's car seat facing the first end. The second plurality of latches may be configured to secure the rear-facing child's car seat facing the second end. The second plurality of latches may be configured to secure a front-facing child's car seat facing the first end.

17 Claims, 11 Drawing Sheets

BICYCLE TRAILERS

CROSS REFERENCE TO RELATED APPLICATIONS

This application is a divisional application of the earlier U.S. Utility Patent Application to Fricke entitled "Bicycle Trailers," application Ser. No. 16/118,153, filed Aug. 30, 2018, now pending, the disclosure of which is hereby incorporated entirely herein by reference.

BACKGROUND

1. Technical Field

Aspects of this document relate generally to trailers, such as bicycle trailers. More specific implementations involve bicycle trailers configured to hold child.

2. Background

Trailers have been used to haul cargo and passengers. Trailers generally lack a motor and are configured to attach to a powered vehicle. The powered vehicle may be an automobile, an animal, or a person-powered vehicle. The trailer can attach to the powered vehicle through a hitch.

SUMMARY

Implementations of bicycle trailers may include a first end and a second end, the second end opposite the first end, a first plurality of latches coupled to the first end, and a second plurality of latches coupled to the second end. The first plurality of latches may be configured to secure a rear-facing child's car seat facing the first end. The second plurality of latches may be configured to secure the rear-facing child's car seat facing the second end. The second plurality of latches may be configured to secure a front-facing child's car seat facing the first end.

Implementations of bicycle trailers may include one, all, or any of the following:

The bicycle trailer may include a bed covering a floor of the trailer.

The front-facing child's car seat may be configured to couple to three latches of the second plurality of latches.

The bicycle trailer may include a first substantially closed wall extending from a first side of the trailer, a second substantially closed wall extending from a second side of the trailer, and a third substantially closed wall extending from the second end of the trailer.

The second plurality of latches may be accessible through an opening in the first substantially closed wall and an opening in the second substantially closed wall.

The trailer may be collapsible.

Each latch of the first plurality of latches and at least two latches of the second plurality of latches may include a ring coupled to an eye bolt. A diameter of a band of the ring may be sized to meet a coupling requirement for a car seat lower anchors and tethers for children (LATCH) system.

A diameter of the band of the ring may be 6 mm.

Implementations of bicycle trailers may include a frame including a floor including a first end and a second end, the first end opposite the second end, a first wall coupled to and extending perpendicularly from a first side of the floor, a second wall coupled to and extending perpendicularly from a second side of the floor, the second side of the floor opposite the first side of the floor, and a third wall coupled to and extending perpendicularly from the second end of the floor. The bicycle trailers may include a first latch coupled to the second end of the floor and to the first side of the floor, a second latch coupled to the second end of the floor and to the second side of the floor, and a third latch coupled to the third wall. The bicycle trailers may also include a first wheel coupled to the first side of the floor, a second wheel coupled to the second side of the floor, and a tow bar coupled to the first end of the floor. The tow bar may be configured to couple to a bicycle.

Implementations of bicycle trailers may include one, all, or any of the following:

The first wall and the second wall may each include an opening at the second end of the trailer configured to allow a car seat to couple to the first latch and the second latch.

The first latch, the second latch, and the third latch may be rotatable.

The bicycle trailers may include a storage compartment removably coupled to the third wall.

The bicycle trailers may include a fourth latch coupled to the first end of the floor and to the first side of the floor and a fifth latch coupled to the first end of the floor and to the second side of the floor.

Each latch of the first plurality of latches and at least two latches of the second plurality of latches may include a ring coupled to an eye bolt. A diameter of a band of the ring may be sized to meet a coupling requirement for a car seat lower anchors and tethers for children (LATCH) system.

A diameter of the band of the ring may be 6 mm

Implementations of bicycle trailers may include a frame including a floor including a first end and a second end, the first end opposite the second end, a first wall coupled to and extending perpendicularly from a first side of the floor, a second wall coupled to and extending perpendicularly from a second side of the floor, the second side of the floor opposite the first side of the floor, and a third wall coupled to and extending perpendicularly from the second end of the floor. The bicycle trailers may include a plurality of latches coupled to the first end of the floor and to the second end of the floor. The bicycle trailers may also include a first wheel coupled to the first side of the floor, a second wheel coupled to the second side of the floor, and a tow bar coupled to the first end of the floor. The tow bar may be configured to couple to a bicycle. At least four latches of the plurality of latches may each include a ring coupled to an eye bolt.

Implementations of bicycle trailers may include one, all, or any of the following:

The bicycle trailer may be collapsible.

A latch of the plurality of latches may be configured to couple to the first end of the floor through the tow bar.

The bicycle trailers may include a storage box removably coupled to the third wall.

The first wall and the second wall may each include an opening at the second end of the trailer configured to allow a car seat to couple to the first latch and the second latch.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DESCRIPTION

This disclosure, its aspects and implementations, are not limited to the specific components, assembly procedures or method elements disclosed herein. Many additional components, assembly procedures and/or method elements known in the art consistent with the intended bicycle trailers will become apparent for use with particular implementations from this disclosure. Accordingly, for example, although particular implementations are disclosed, such implementations and implementing components may comprise any shape, size, style, type, model, version, measurement, concentration, material, quantity, method element, step, and/or the like as is known in the art for such bicycle trailers, and implementing components and methods, consistent with the intended operation and methods.

While the implementations disclosed herein primarily refer to bicycle trailers, it is understood that the trailers disclosed herein may also be configured to hitch to a vehicle that is not a bicycle, such as, by non-limiting example, a golf cart, an ATV, a go kart, or a tricycle. Further, in various implementations the trailers disclosed herein may be configured to be pulled directly by a human or animal. Further, while the implementations of the bicycle trailers disclosed herein primarily refer to implementations configured to carry a child's car seat, it is understood that the implementations disclosed herein may be used for carrying other cargo. Finally, while various and different implementations trailers are disclosed herein, it is understood that the various implementations of trailers may include elements or components of other implementations of trailers disclosed herein.

Figure 1:
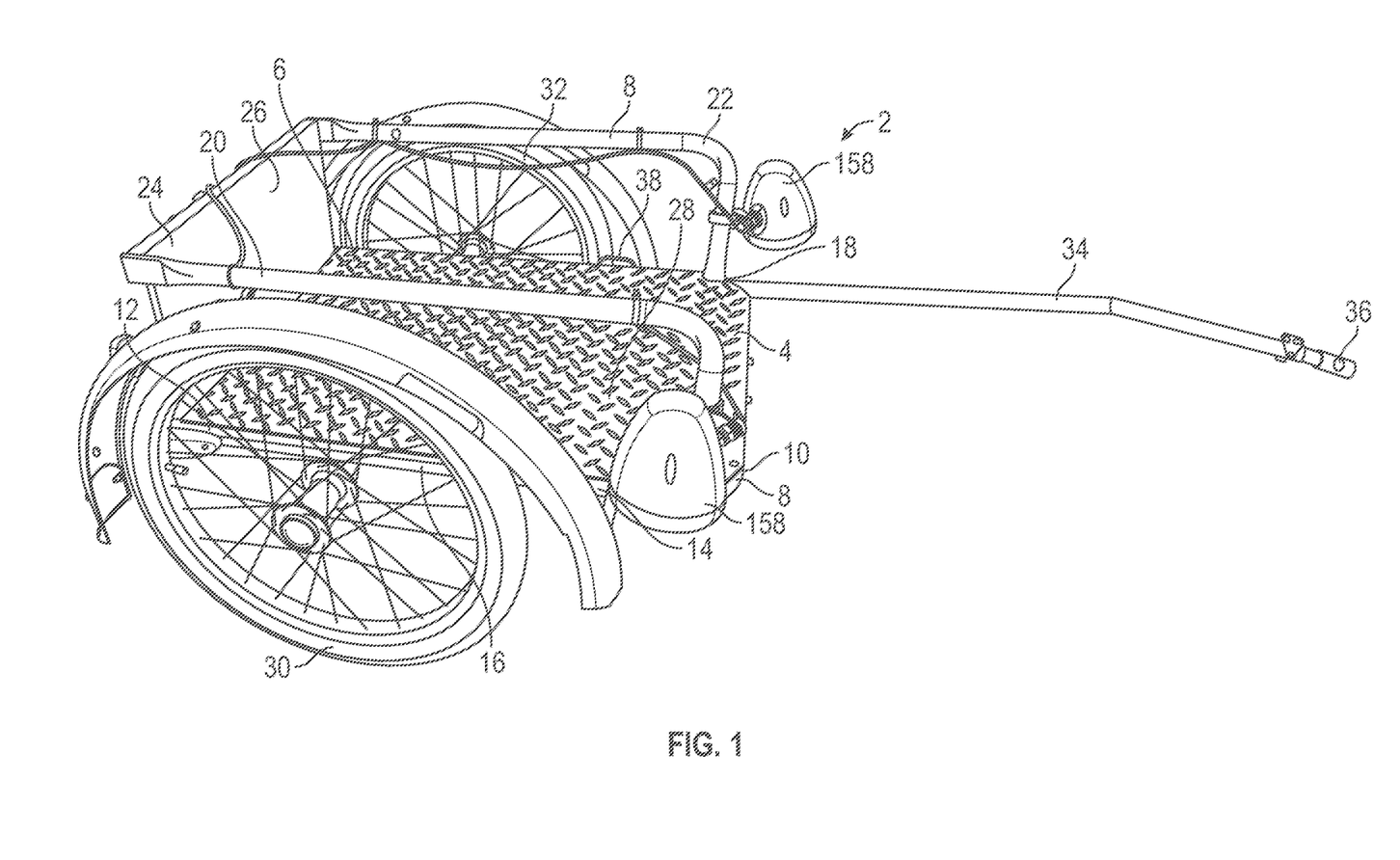
FIG. 1 is a side perspective view of a first implementation of a bicycle trailer.

Referring to FIG. 1, a side perspective view of a first implementation of a bicycle trailer is illustrated. The bicycle trailer 2 (hereinafter "trailer") includes a first end 4 and a second end 6 opposite the first end. As illustrated by FIG. 1, the first end 4 may be the front end (or the end configured to couple to the bicycle) and the second end 6 may be the rear end (or the end furthest from the bicycle). The trailer 2 includes a frame 8. The frame may be made from, by non-limiting example, aluminum, steel (including carbon steel), titanium, other metals and alloys thereof, carbon fiber, plastic, various combinations of the foregoing, or other rigid materials. The frame 8 includes a floor 14 which, like the trailer 2, may include a first end 10 and a second end 12 respectively corresponding with the first end 4 and the second end 6 of the trailer. As used herein, "first end" and "second end" refer to the portion of the floor or the trailer adjacent to the respective end rather than just the surface/plane at the very end of the floor or trailer. The frame 8 also includes a first side 16 and a second side 18. In various implementations, the frame 8 may include a first wall 20 coupled to and extending perpendicularly from a first side 16 of the floor 14, a second wall 22 coupled to and extending perpendicularly from the second side 18 of the floor 14, and/or a third wall 24 coupled to and extending perpendicularly from the second end 12 of the floor. The third wall may be coupled to and between the first wall 20 and the second wall 22. In such implementations, the first wall 20, the second wall 22, and the third wall 24 may partially enclose and secure cargo configured to be carried in the trailer.

As illustrated in FIG. 1, the first wall 20 and the second wall 22 may include just the frame and be open through the wall. In contrast with this, the third wall 24 may be a solid wall and include a panel 26 preventing access through the wall. In other implementations, any of the first wall 20, the second wall 22, and the third wall 24 may be opened (contain an opening therein similar to the illustration of the first wall 20 and the second wall 22 in FIG. 1) or closed (contain no openings therein similar to the illustration of the third 24 wall in FIG. 1). In still other implementations, the trailer 2 may include a fourth wall coupled to and extending perpendicularly from the first end 10 of the floor 14. In such implementations, the first wall, the second wall, the third wall, and the fourth wall may form a closed perimeter extending from the floor of the trailer. As illustrated by FIG. 1, the floor 14 of the frame 8 may be coupled to a bed 28. The bed 28 may be made from any material disclosed herein and may prevent cargo from falling through the floor 14 of the frame 8.

The trailer 8 includes a first wheel 30 coupled to the first side 16 of the frame 8 and a second wheel 32 coupled to the second side 18 of the frame 8. In various implementations, the first wheel 30 may rotate on a first axle and the second wheel 32 may rotate on a second axle independent of the first axle. In other implementations, the first wheel 30 and the second wheel 32 may both rotate upon a single axle. The trailer 2 also includes a tow bar 34 coupled to the frame 8 which may include, or be coupled to, a hitch 36. The hitch 36 may be configured to couple to a rear axle of a bicycle. In such implementations, a rear skewer may be configured to extend through and bind an attachment mechanism of the trailer to the bicycle. In other implementations, the hitch may be configured to couple to the chainstay, or rear triangle, of the bicycle. In still other implementations, the tow bar may be angled upwards and the hitch may be configured to couple to the seat post. In other implementations, the hitch may be configured to couple to various parts of the bicycle using other attachment mechanisms.

As illustrated by FIG. 1, the trailer 2 may include a first ring 38 coupled to the first end 10, or front end, of the floor 14. Though not illustrated in FIG. 1, the trailer may also include a second ring opposite the first ring, also coupled to the first end 10 of the floor 14. The ring 38, as illustrated by FIG. 1, is fixedly attached to the frame 8 and is not rotatable.

Figure 2:
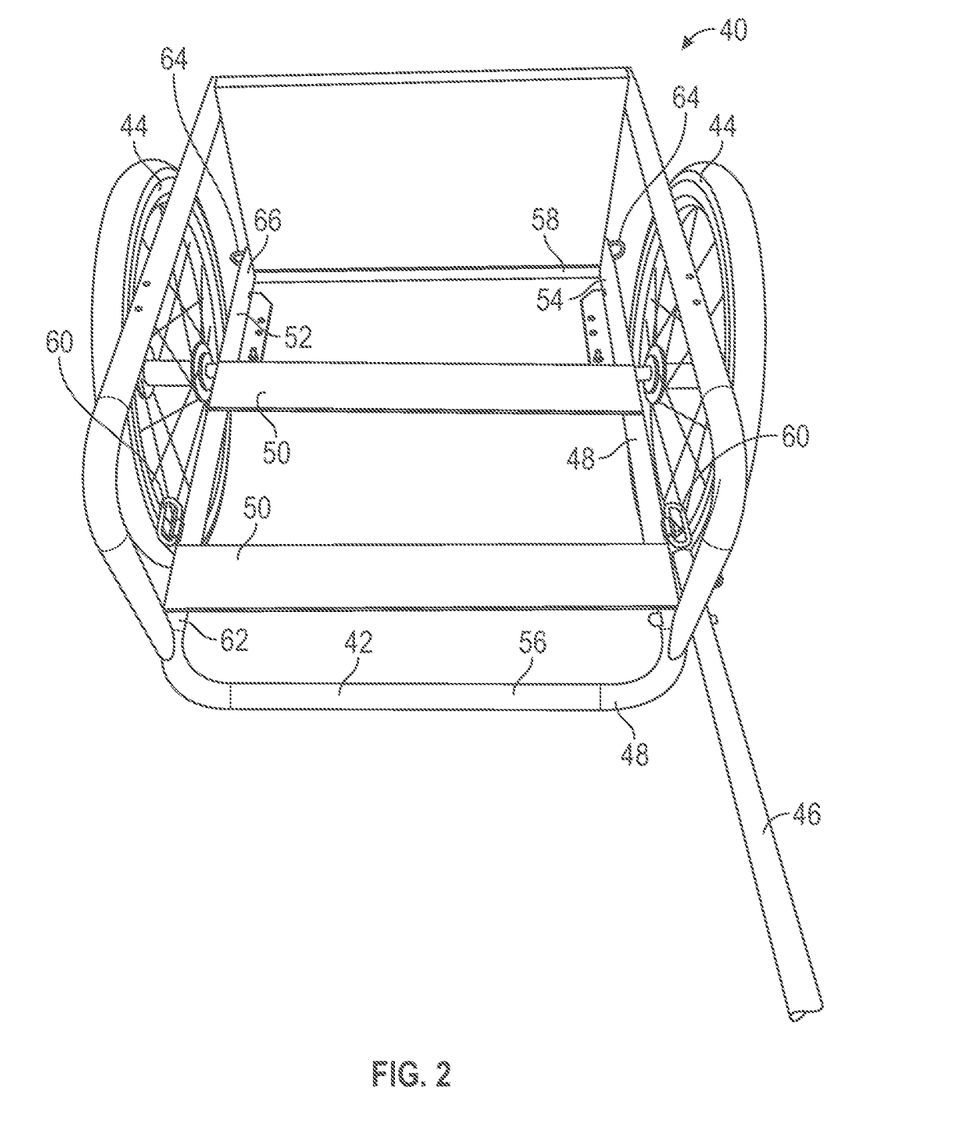
FIG. 2 is a front perspective view of a second implementation of a bicycle trailer.

Referring to FIG. 2, a front perspective view of a second implementation of a bicycle trailer is illustrated. The general structure of the trailer 40, such as the frame 42, wheels 44, and towbar 46 may be the same as or similar to the general structure of the bicycle trailer of FIG. 1. As illustrated by FIG. 2, the frame 42 may include a floor 48. The floor may include one or more slats 50 extending from a first side 52 of the frame 42 to a second side 54 of the frame 42. In other implementations, the slats may extend from the first end 56 of the frame 42 to the second end 58 of the frame 42. In various implementations, the trailer 40 may not include a bed. The trailer 40 may include a first plurality of latches 60 coupled to the first end 62 of the trailer 40. As illustrated by FIG. 2, the first plurality of latches may be rotatable about a single axis. In particular implementations, the first plurality of latches may include a plurality of quick links. In such implementations, the locking portion of the quick link may be fixed to the first end 56 of the frame. The quick link, or other type of latch, may be fixed to the frame through a weld or an adhesive.

In various implementations, the trailer 40 includes a second plurality of latches 64 coupled to the second end 66 of the trailer. The second plurality of latches 64 may be rotatable about a single axis which may be the same axis or a different axis from the axis the first plurality of latches 60 rotates about. In various implementations, the second plurality of latches are eye bolts coupled to the frame 42.

Figure 3:
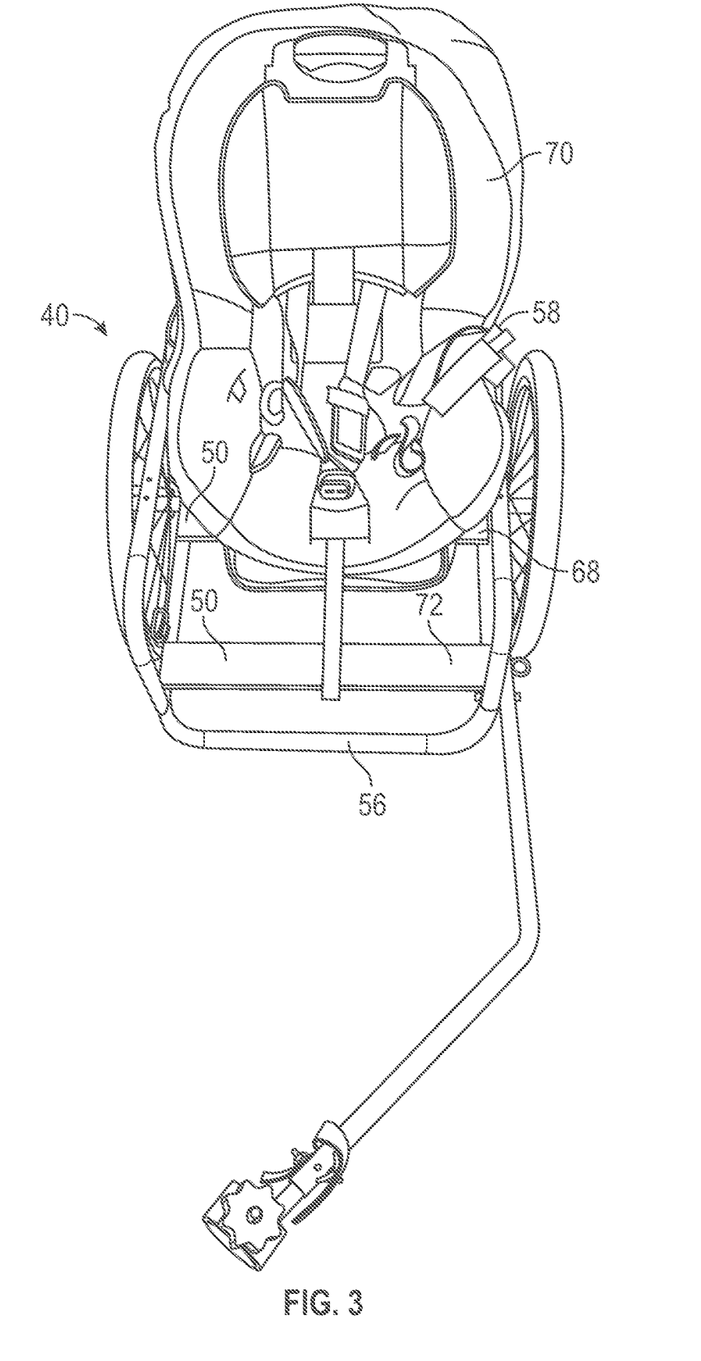
FIG. 3 is a front perspective view of the bicycle trailer of FIG. 2 carrying a car seat.

Referring to FIG. 3, a front perspective view of the bicycle trailer of FIG. 2 carrying a car seat is illustrated. In various implementations of trailers disclosed herein, the width of the floor 48 of the frame 42 may be wider than the width of various types of children's car seats. In various implementations, a first slat 68 of the plurality of slats 50 may be configured to support the car seat 70. The first slat 68 may be configured to support a front-facing car seat facing the first end 62 of the trailer 40. The first slat 68 may also be configured to support a rear-facing car seat facing the second end 66 of the trailer 40. Alternatively, a second slat 72 of the plurality of slats 50 may be configured to support a rear-facing car seat facing the first end 62 of the trailer.

Figure 4:
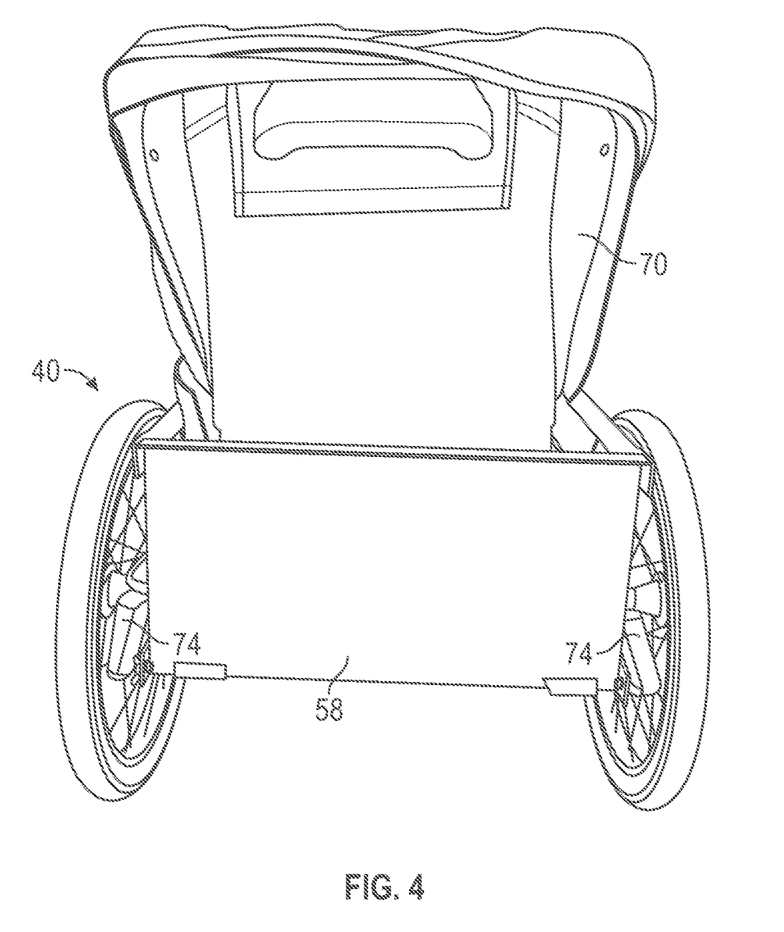
FIG. 4 is a rear perspective view of the bicycle trailer of FIG. 3.

Referring to FIG. 4, a rear perspective view of the bicycle trailer of FIG. 3 is illustrated. In the implementations disclosed herein, and as illustrated by FIG. 4, various types of car seats may be configured to tether to either the first plurality of latches 60 or the second plurality of latches 64, as illustrated by FIG. 2. The car seats may be configured to tether to either the first plurality of latches 60 or the second plurality of latches 64 through the car seats Lower Anchors and Tethers for Children (LATCH) system. In rear-facing car seats (or infant car seats), the LATCH system may be included in a base. As used herein, the base of the car seat is considered a part of the car seat. In implementations of rear-facing car seats including a base, the LATCH system may include tethers which extend from a front of the base (or side of the base adjacent to the front of the car seat). In front-facing car seats (or toddler car seats), the car seat does not include a base similar to the rear-facing car seat, but the LATCH system is coupled to the car seat near the bottom of the car seat. The LATCH system for such car seats may include tethers which extend from the bottom and rear of the base. The tethers include attachment mechanisms at the end thereof configured to attach to either the first plurality of latches 60 or the second plurality of latches 64. The attachment mechanisms may include a hook, a quick release attachment mechanism (configured to snap onto the latch and release from the latch with the press of a button), or any other type of attachment mechanism.

As illustrated by FIG. 4, the car seat 70 includes a plurality of attachment mechanisms 74 (which are part of the car seats LATCH system) attached to the second plurality of latches (which are not seen as they are covered by the attachment mechanism). While the implementation illustrated by FIG. 4 is of a front-facing car seat secured facing the first end of the trailer 40 to the second plurality of latches, the trailer 40 is also configured to secure, using the second plurality of latches, a rear-facing car seat facing the second end 66 of the trailer 40. In other implementations, the first plurality of latches located at the first end of the trailer 40 may be configured to secure a rear-facing child's car seat facing the first end of the trailer 40. In various implementations, the first plurality of latches 60 and the second plurality of latches 64 may be sized so as to be able to receive the attachment mechanism of a car seat. In particular implementations, a band of the latch may be 6 mm in diameter in order to properly receive the attachment mechanism of the car seat. In other implementations, the band of the latch may be more or less than 6 mm in diameter.

Figure 5:
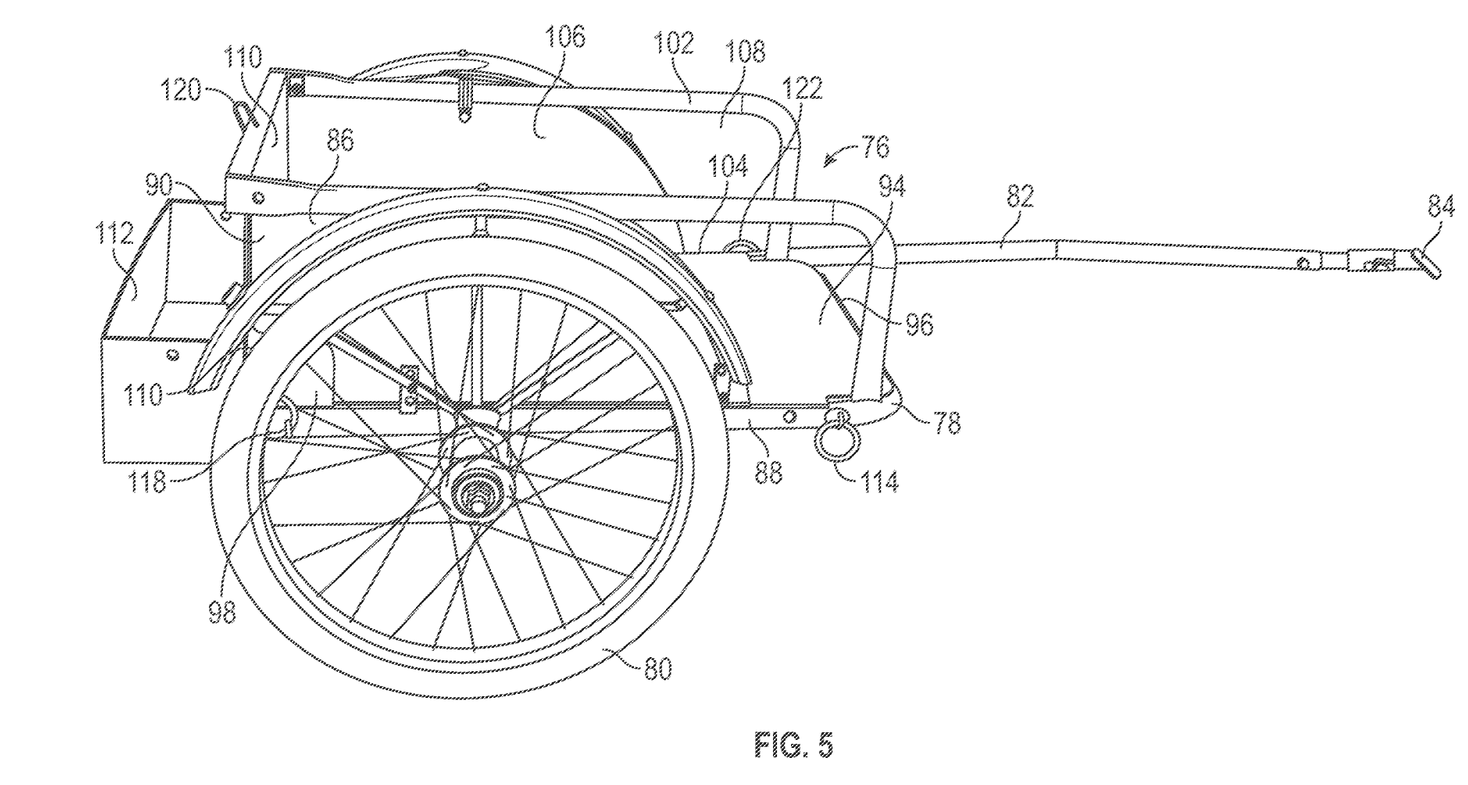
FIG. 5 is a side perspective view of a third implementation of a bicycle trailer.

Referring to FIGS. 5-10, various views of a third implementation of a bicycle trailer and portions thereof are illustrated. Referring specifically to FIG. 5, a side perspective view of a third implementation of a bicycle trailer is illustrated. The general structure of the trailer 76, such as the frame 78 (which includes a floor and walls as previously disclosed herein), wheels 80, tow bar 82, and hitch 84 may be the same as or similar to the general structure of the bicycle trailer of FIG. 1 or FIG. 2. Specifically, as illustrated by FIG. 5, the trailer 76 includes a first substantially closed wall 86 extending from a first side 88 of the trailer 76. The first wall 86 may include a panel 90. The panel 90 may block the wheel coupled to the first side 88 of the trailer 76 from the interior of the trailer (or the space coupled between the first wall 86 and the second wall 102). In implementations where the trailer 76 is configured to carry a car seat, the panel 90 may prevent a child from reaching into the wheel coupled to the first side 88 of the trailer. As illustrated by FIG. 5, the first wall 86 is only substantially closed as it still includes a first opening 94 located near a first end 96 of the trailer and a second opening 98 located near the second end 100 of the trailer 76. In various implementations, the first opening 94 may allow for a car seat to be tethered to a latch through the first opening. Similarly, the second opening 98 may allow for a car seat to be tethered to a latch through the second opening. The trailer 76 may include a second substantially closed wall 102 extending from a second side 102 of the trailer 76. The second wall 102 may include a panel 106. The panel 106 may block the wheel coupled to the second side 104 of the trailer 76 from the interior of the trailer (or the space coupled between the first wall 86 and the second wall 102). In implementations where the trailer 76 is configured to carry a car seat, the panel 106 may prevent a child from reaching into/touching the wheel or spokes of the wheel coupled to the second side 104 of the trailer. As illustrated by FIG. 5, the second wall 102 is only substantially closed as it still includes a first opening 108 located near a first end 96 of the trailer and a second opening (not illustrated as it is blocked by the first wall) located near the second end 100 of the trailer 76. In various implementations, the first opening 108 may allow for a car seat to be tethered to a latch through the first opening. Similarly, the second opening may allow for a car seat to be tethered to a latch through the second opening. The trailer 76 may also include a third substantially closed wall 110 extending from the second end 100 of the trailer 76. The third wall 110 may be coupled between the first wall 86 and the second wall 102. In other implementations, the third wall 110 contains no openings.

Still referring to FIG. 5, the trailer 76 may include a cargo box/storage compartment 112 coupled to the second end 100 of the trailer. In particular implementations, the cargo box 112 may be directly coupled to the third wall 110. In such implementations, the cargo box may be coupled to the third wall through a plurality of screws, bolts, or other fastening mechanism. The cargo box may be removably coupled to the second end 100 and/or to the third wall 110.

The trailer 76 includes a first latch 118 coupled to the second end of trailer and to the first side of the trailer. The first latch 118 may be coupled to the second end of a floor of the frame of the trailer and to the first side of the floor of the frame of trailer, as the ends and sides of the floor correspond to the ends and sides of the trailer. In various implementations, the trailer 76 may include a second latch coupled to the second end 100 of the trailer and to the second side 104 of the trailer. The trailer 76 may also include a third latch 120 coupled to the third wall. In various implementations, a front-facing car seat facing the first end 96 of the trailer may be configured to couple to the first latch 118, the second latch, and the third latch 120. Similarly, in various implementations, a rear-facing car seat facing the second end 100 of the trailer may be configured to couple to the first latch 118 and the second latch opposite the first latch (the second latch is not illustrated by FIG. 5, but is illustrated as latch 124 if FIG. 8). The first latch 118, the second latch, and the third latch 120 may all be rotatable. In particular implementations, the latches are rotatable about a single axis, while in other implementations the latches are rotatable about multiple axis.

Figure 6:
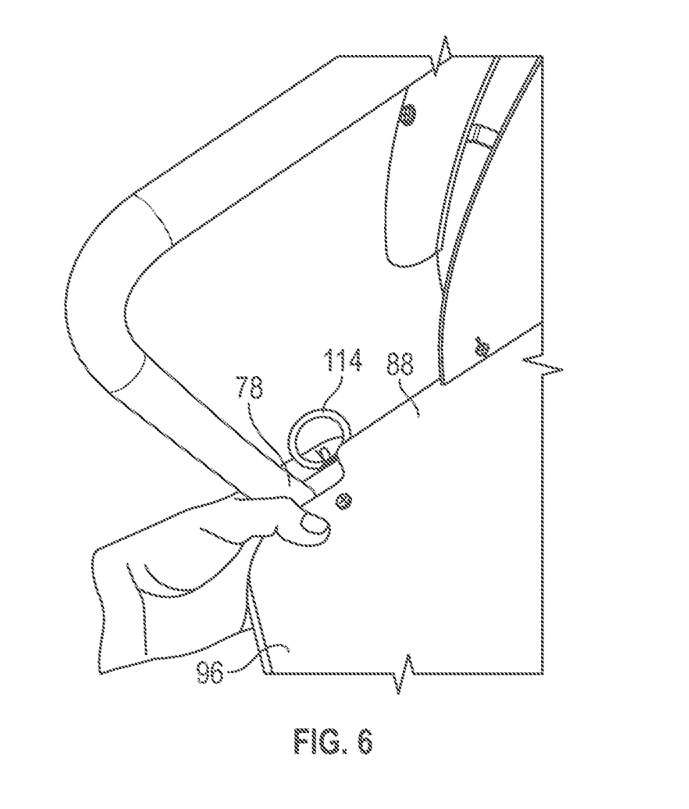
FIG. 6 is a magnified view of a fourth latch of the bicycle trailer of FIG. 5.
Figure 7:
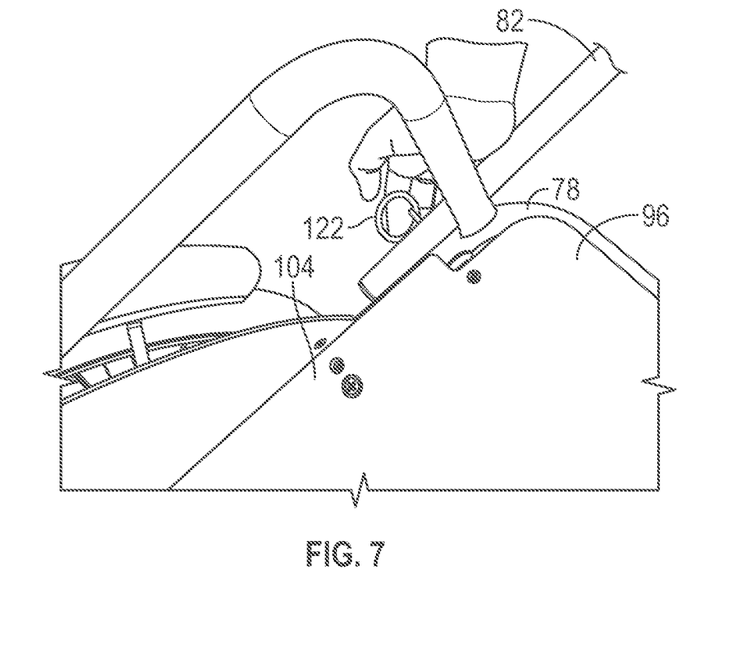
FIG. 7 is a magnified view of a fifth latch of the bicycle trailer of FIG. 5.

In various implementations, the trailer 76 may include a fourth latch 114 coupled to the first end 96 of the trailer and to the first side 88 of the trailer. The trailer 76 may also include a fifth latch 122 coupled to the first end 96 of the trailer and to the second side 104 of the trailer. As disclosed herein, the fourth latch 114 and the fifth latch 122 may be considered as a first plurality of latches while the first latch 118, the second latch 124, and the third latch 120 may be considered as the second plurality of latches. The fourth latch 114 and the fifth latch 122 may also be rotatable about one or more axis. Referring to FIG. 6, a magnified view of a fourth latch of the bicycle trailer of FIG. 5 is illustrated. Referring to FIG. 7, a magnified view of a fifth latch of the bicycle trailer of FIG. 5 is illustrated. Both FIGS. 6-7 illustrate that the latch may be rotatable as a user in both figures is illustrated as preventing the latch from falling to a downward position. The latches disclosed herein may be directly coupled to/into the frame 78 of the trailer 76. More specifically, the first latch 118, the second latch, the fourth latch 114, and the fifth latch 122 may be directly coupled to a floor of the frame 78 while the third latch may be coupled to a wall of the frame.

Figure 8:
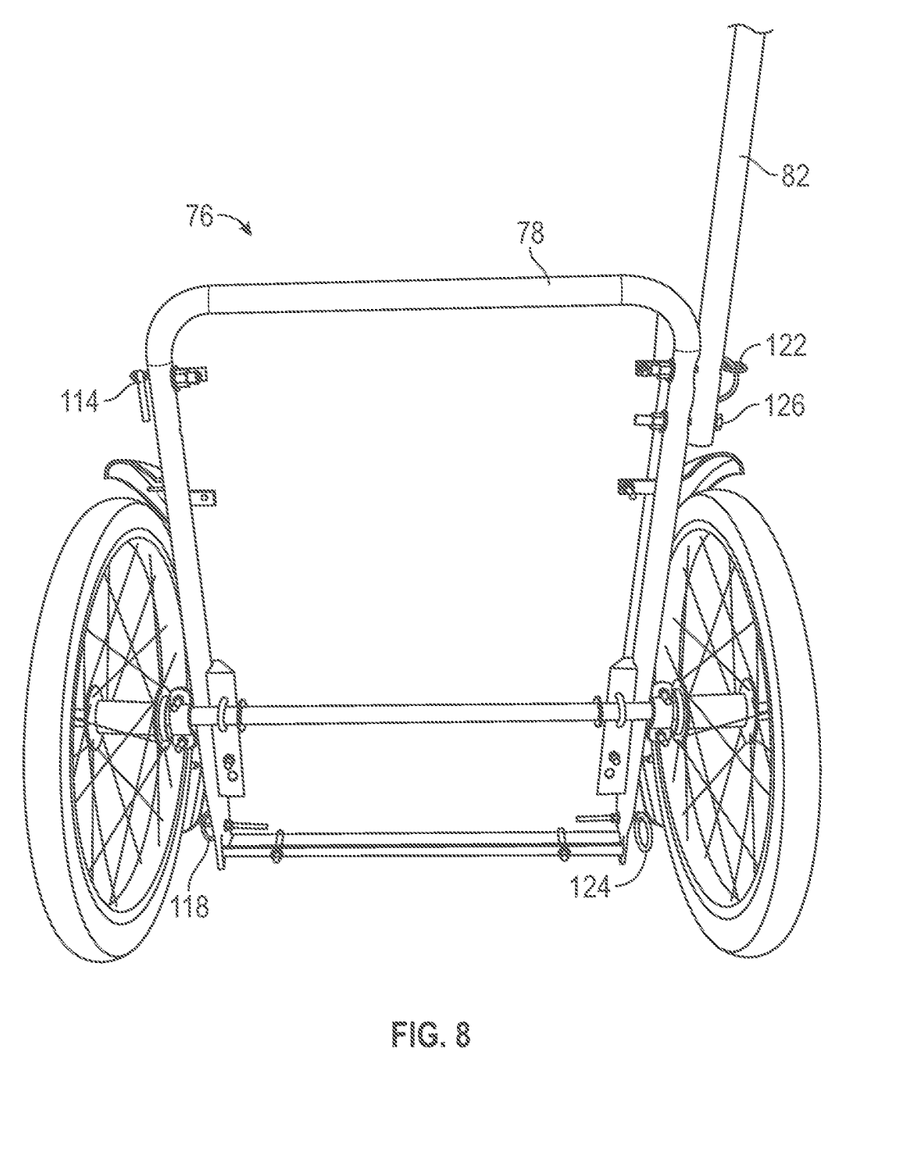
FIG. 8 is a bottom perspective view of the bicycle trailer of FIG. 5.

Referring to FIG. 8, a bottom perspective view of the bicycle trailer of FIG. 5 is illustrated. As illustrated by FIG. 8, the cargo box 112 illustrated in FIG. 5 is removed. In various implementations including a cargo box, it may be removable to allow for the trailer 76 to stand up and be stored. In various implementations, and as illustrated by FIG. 8, the fifth latch 122 may be coupled through the tow bar 82 which may be directly coupled to the frame 78. In various implementations, the tow bar may also be collapsible/foldable. As is illustrated, the tow bar 82 may be fastened to the frame 78 through the fifth latch 122 along with a second bolt 126. Upon removing either the fifth latch 122 or the bolt 126, the tow bar 82 may pivot about either the fifth latch 122 or the bolt 126. In such implementations, the tow bar 82 may be folded towards the frame 78 of the trailer 76 in order to conserve space while being stored. As illustrated by FIG. 8, the first latch 118 may be coupled through the frame 78, the second latch 124 may be coupled through the frame 78, the fourth latch 114 may be coupled through the frame 78, and the fifth 122 latch may be coupled through the frame 78. In various implementations, rather than a bolt 126, a spring biased/loaded pull pin may be utilized to allow the user to more quickly release the tow bar for folding toward the frame 78.

Figure 11:
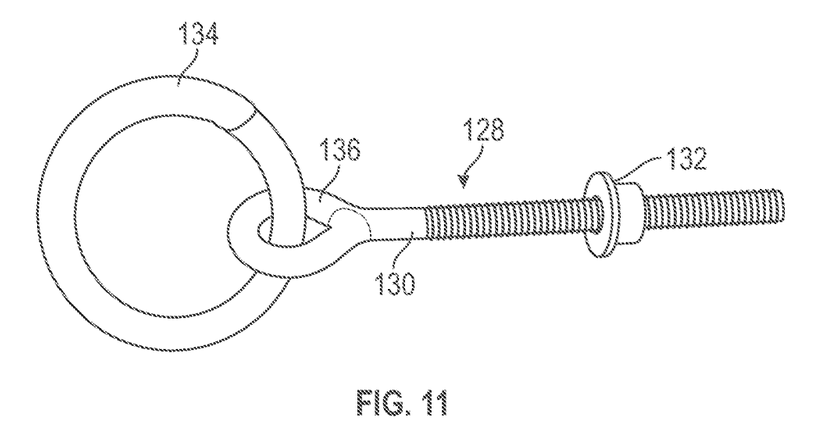
FIG. 11 is a perspective view of a latch.

Referring to FIG. 11, a magnified view of an implementation of a latch is illustrated. In various implementations, the latch 128 may include an eye bolt 130. The eye bolt may be configured to extend through an opening in a frame and be secured to the frame through the nut 132. In other implementations, the eye bolt may consist of a smooth shaft rather than a threaded shaft and may include a hole for a pin at the end thereof. In such implementations, the eye bolt may be quickly and easily removed from the frame. In implementations having a collapsible tow bar with a latch coupling the tow bar to the frame, the ability to quickly remove the latch (or eye bolt) may result in the ability to quickly fold down or collapse the tow bar. In various implementations, the latch 128 when inserted through a frame may be rotatable as much as 360 degrees along the axis of the shaft of the eye bolt. The latch 128 may include a ring 134 coupled to and through the eye 136 of the eye bolt. As the ring 134 is coupled through the eye 136 of the eye bolt 130, the ring portion of the latch may be rotatable along an axis perpendicular to the axis about the shaft of the eye bolt. Thus, in particular implementations the latch 128 may be rotatable about multiple axis. In various implementations, the ring is configured to receive the attachment mechanism of a LATCH system. Accordingly, the ring may be sized to correspond to the LATCH regulations and specifications. In a particular corresponding implementation, the diameter of the band of the ring 134 may be 6 mm. In various implementations, the first latch 118, the second latch 124, the third latch 120, the fourth latch 114, and the fifth latch 122 are all the same as or similar to the latch 128 illustrated by FIG. 11. In other implementations, the third latch only includes a ring coupled through a hole in the third wall while the other four latches are the same as or similar to latch 128 illustrated by FIG. 11. In other implementations, the first latch 118, the second latch 124, the fourth latch 114, and the fifth latch 122 may be different from the latch 128 illustrated by FIG. 11.

Figure 9:
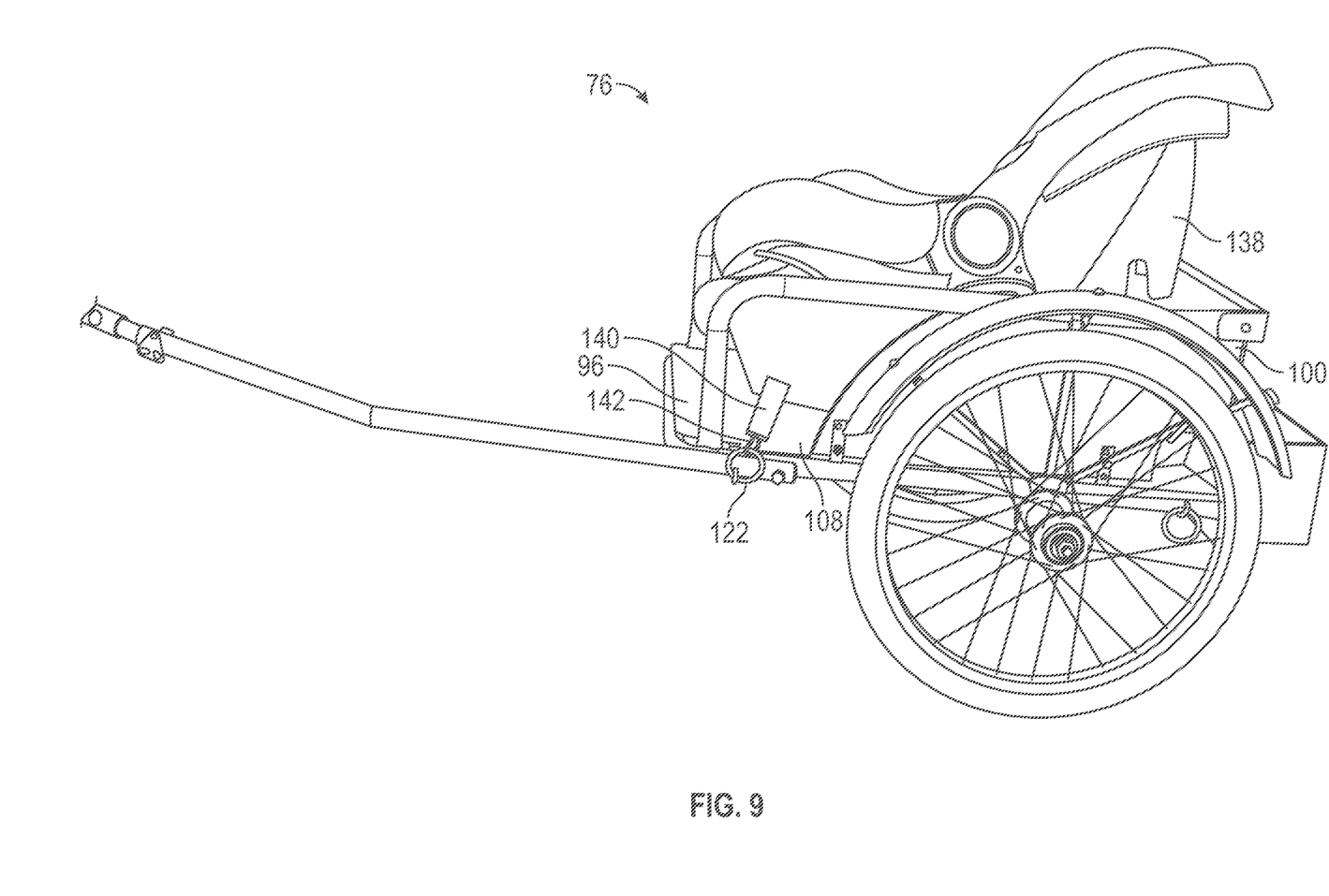
FIG. 9 is a side perspective view of the bicycle trailer of FIG. 5 carrying a car seat.

Referring to FIG. 9, a side perspective view of the bicycle trailer of FIG. 5 carrying a car seat is illustrated. In various implementations, the trailer 76 is configured to carry a rear-facing car seat 138 in a position where the car seat faces the first end of the trailer. In such implementations, the attachment mechanism 142 at the end of the tethers 140 of the rear-facing car seat 138 may be configured to attach to the fifth latch 122 and to the fourth latch 114 (as illustrated by FIG. 5). As illustrated by FIG. 9, the opening 108 in the second wall allows the car seat to be coupled to the fifth latch 122. The opening 94 (as seen in FIG. 5) allows for the other side of the car seat to be coupled to the fourth latch 114.

Figure 10:
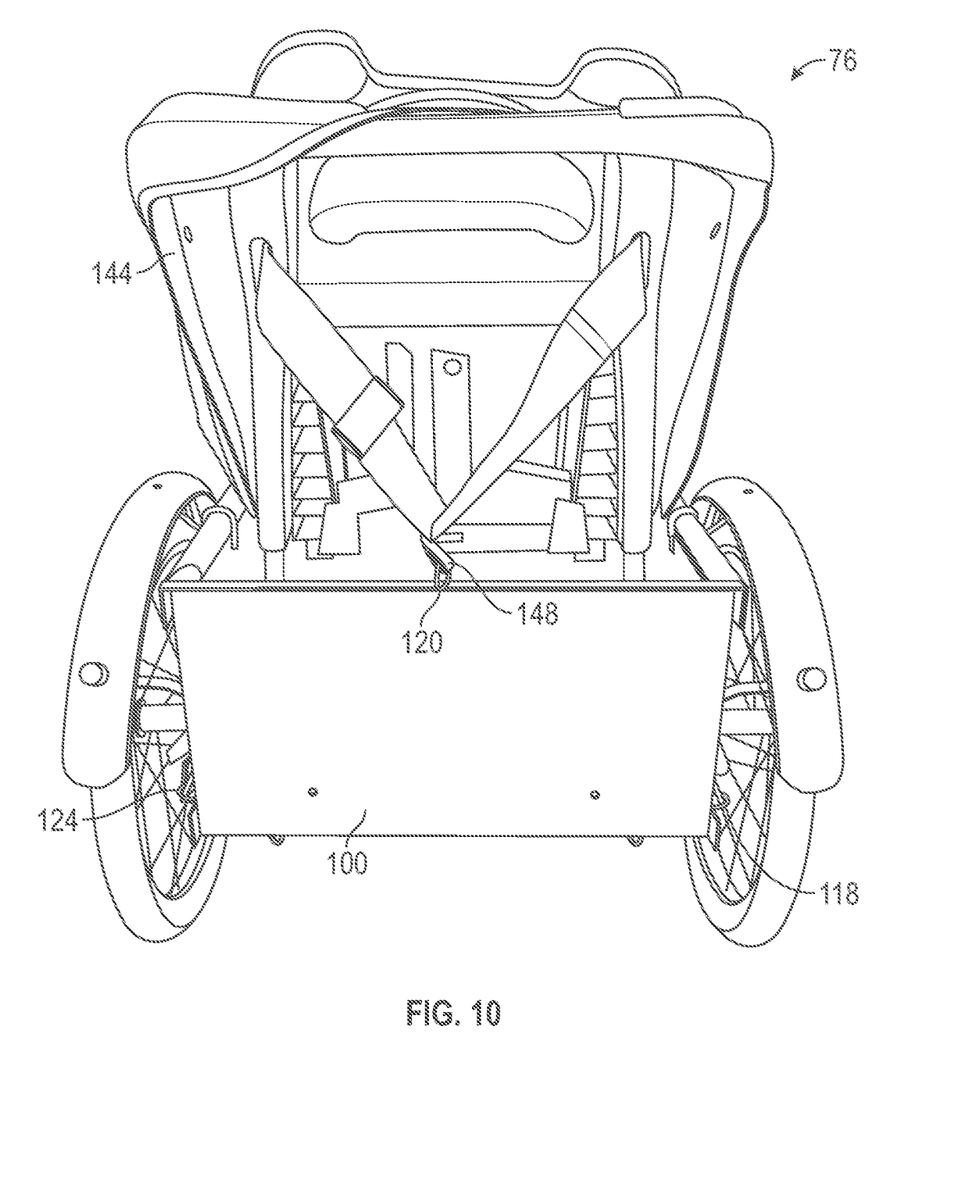
FIG. 10 is a rear perspective view of the bicycle trailer of FIG. 5 carrying a car seat.

Referring to FIG. 10, a rear perspective view of the bicycle trailer of FIG. 5 carrying a car seat is illustrated. In addition to carrying a rear-facing car seat facing the first end 96 of the trailer 76, the trailer may also be configured to carry a front-facing car seat 144. In such an implementation, the front-facing car seat 144 may be configured to couple and tether to three different latches, including the first latch 118, the second latch 124, and the third latch 120. By having the front-facing car seat 144 tethered to the trailer 76 at two lower latches as well as a top latch (or the third latch 120), the front-facing car seat may be securely attached to the trailer 76. In a similar implementation, the first latch 118 and the second latch 124 may be configured to couple to two tethers of a rear-facing car seat facing the second end 100 of the trailer 76, and in turn, secure a rear-facing car seat in the trailer 76.

Figure 12:
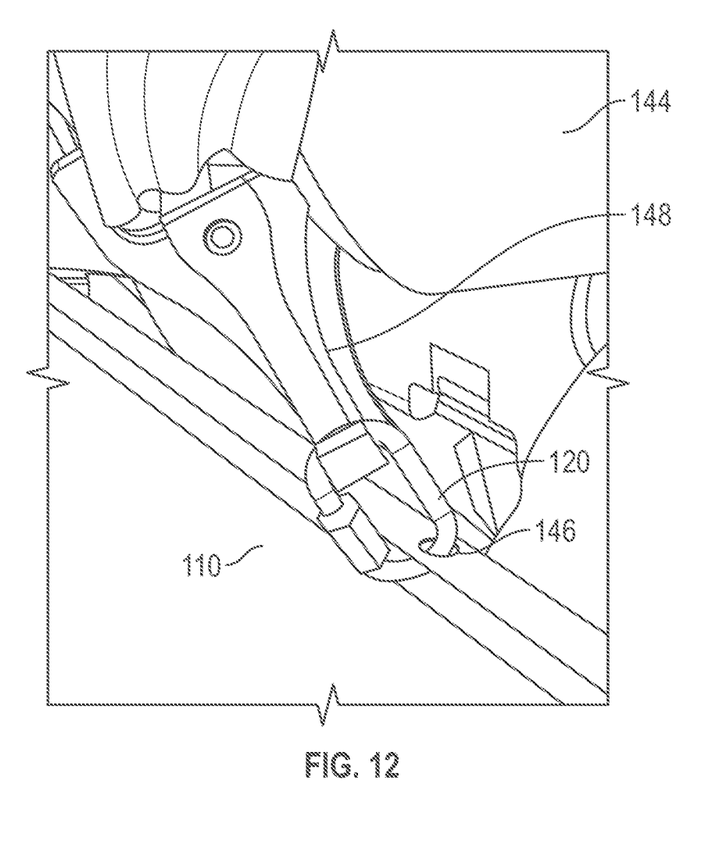
FIG. 12 is a magnified view of a third latch of the bicycle trailer of FIG. 10 coupled to a car seat.

Referring to FIG. 12, a magnified view of the third latch of the bicycle trailer of FIG. 10 coupled to the front-facing car seat is illustrated. In various implementations, the third latch 120 may be a single ring or link that may extend through a hole 146 in the third wall 110 of the trailer 76. As illustrated by FIG. 12, the third latch 120 may be configured to attach to an attachment mechanism 148 of the front-facing car seat 144. The attachment mechanism 148 may be a closed hook, as illustrated, or any other type of attachment mechanism disclosed herein.

Figure 13:
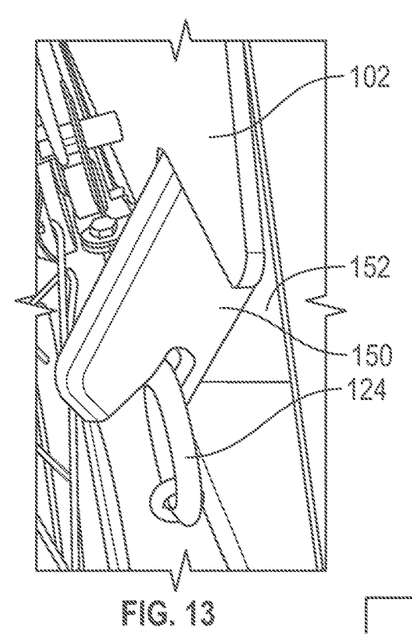
FIG. 13 is a magnified view of a second latch of the bicycle trailer of FIG. 10 coupled to a car seat.

Referring to FIG. 13, a magnified view of a second latch of the bicycle trailer of FIG. 10 coupled to the front-facing car seat is illustrated. In various implementations, the second latch 124 may be configured to attach to an attachment mechanism 150 of a LATCH system. As illustrated by FIG. 13, the second wall 102 may include an opening 152 configured to allow the attachment mechanism and/or a tether through the opening in order to couple the car seat to the second latch 124.

Figure 14:
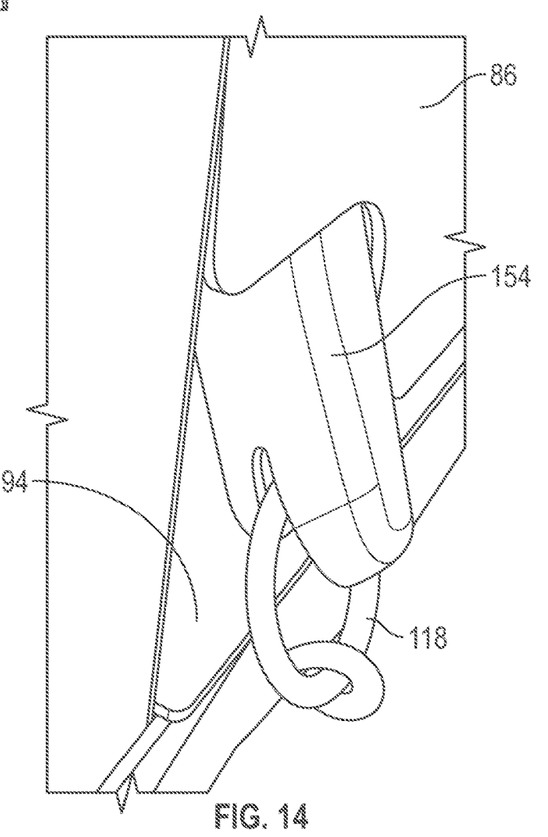
FIG. 14 is a magnified view of a first latch of the bicycle trailer of FIG. 10 coupled to a car seat.

Referring to FIG. 14, a magnified view of a first latch of the bicycle trailer of FIG. 10 coupled to the front-facing car seat is illustrated. In various implementations, the first latch 118 may be configured to attach to an attachment mechanism 154 of a LATCH system. As illustrated by FIG. 14, the first wall 102 may include an opening 94 configured to allow the attachment mechanism and/or a tether through the opening in order to couple the car seat to the first latch 118.

Various implementations of trailers disclosed herein include trailers having a first side wall, a second side wall, and a rear wall. While the figures disclose these walls as not extending above a car seat in the trailer, in other implementations, the first wall, the second wall, the third wall, or any combination thereof may extend above a car seat carried by the trailer. In such implementations, the extended walls may add additional protection of a child carried in a car seat by the trailer. Such implementations may also include a roof. The roof may be retractable, such as a cloth cover to protect a child from sun, rain, or the wind. In various implementations, the retractable roof may extend down and cover the front of the trailer. In other implementations, the roof may include a rigid element coupled to the walls and may serve as a roll bar to protect the child in the event that the trailer is involved in an accident.

Various implementations of the trailers disclosed herein may include lights. The lights may be coupled to the trailer, such as the lights 158 of FIG. 1 (which may be rotatable), or they may be included in the trailer, such as reflectors or lights built in to the frame or walls of the trailer. In such implementations, a battery pack may be coupled to the trailer in order to power the lights.

In various implementations, the trailers disclosed herein may be collapsible. In such implementations, the walls of the trailer may either fold down against the floor of the frame or may be entirely removed. Similarly, in such implementations the wheels may be either removed or may also fold down towards the floor of the frame.

The implementations disclosed herein rely on a car seat including the LATCH system. It is understood that the implementations of the trailers disclosed herein may be configured to secure a car seat that does not include or is not compatible with the LATCH system. In such implementations, one or more straps may be configured to fixedly couple to the latches of the trailer and secure either a rear-facing car seat or a front-facing car seat in the same manner a seat belt would secure the rear-facing car seat or the front-facing car seat. The one or more straps may be fixedly coupled to the latches or may be removably coupled to the latches. In implementations where the one or more straps are fixedly coupled to the latches, each latch may be fixedly coupled to a strap and the straps may be configured to couple to other straps fixedly coupled to the other latches.

In places where the description above refers to particular implementations of bicycle trailers and implementing components, sub-components, methods and sub-methods, it should be readily apparent that a number of modifications may be made without departing from the spirit thereof and that these implementations, implementing components, sub-components, methods and sub-methods may be applied to other bicycle trailers.

What is claimed is:

1. A bicycle trailer comprising:
a first end and a second end, the second end opposite the first end;
a first plurality of latches coupled to the first end; and
a second plurality of latches coupled to the second end;
wherein the first plurality of latches is configured to secure a rear-facing child's car seat facing the first end;
wherein the second plurality of latches is configured to secure the rear-facing child's car seat facing the second end;
wherein the second plurality of latches is configured to secure a front-facing child's car seat facing the first end; and
wherein each latch of the first plurality of latches and at least two latches of the second plurality of latches comprises a ring coupled to an eye bolt, wherein a diameter of a band of the ring is sized to meet a coupling requirement for a car seat lower anchors and tethers for children (LATCH) system.

2. The bicycle trailer of claim 1, further comprising a bed covering a floor of the trailer.

3. The bicycle trailer of claim 1, wherein the front-facing child's car seat is configured to couple to three latches of the second plurality of latches.

4. The bicycle trailer of claim 1, further comprising:
a first substantially closed wall extending from a first side of the trailer;
a second substantially closed wall extending from a second side of the trailer; and
a third substantially closed wall extending from the second end of the trailer.

5. The bicycle trailer of claim 4, wherein the second plurality of latches is accessible through an opening in the first substantially closed wall and an opening in the second substantially closed wall.

6. The bicycle trailer of claim 1, wherein the trailer is collapsible.

7. The bicycle trailer of claim 1, wherein a diameter of the band of the ring is 6 mm.

8. A bicycle trailer comprising:
a first end and a second end, the second end opposite the first end; and
a plurality of latches coupled to the second end;
a first substantially closed wall extending from a first side of the trailer; and
a second substantially closed wall extending from a second side of the trailer;

wherein the plurality of latches is accessible through an opening in the first substantially closed wall and an opening in the second substantially closed wall;

wherein the plurality of latches is configured to secure a rear-facing child's car seat facing the second end; and wherein the plurality of latches is configured to secure a front-facing child's car seat facing the first end.

9. The bicycle trailer of claim 8, further comprising a bed covering a floor of the trailer.

10. The bicycle trailer of claim 8, wherein the front-facing child's car seat is configured to couple to three latches of the plurality of latches.

11. The bicycle trailer of claim 8, wherein the trailer is collapsible.

12. The bicycle trailer of claim 8, wherein at least two latches of the plurality of latches comprises a ring coupled to an eye bolt, wherein a diameter of a band of the ring is sized to meet a coupling requirement for a car seat lower anchors and tethers for children (LATCH) system.

13. The bicycle trailer of claim 12, wherein a diameter of the band of the ring is 6 mm.

14. A bicycle trailer comprising:
a first end and a second end, the second end opposite the first end; and
a plurality of latches coupled to the second end;
wherein the plurality of latches is configured to secure a rear-facing child's car seat facing the second end;
wherein the plurality of latches is configured to secure a front-facing child's car seat facing the first end; and
wherein at least two latches of the plurality of latches comprises a ring coupled to an eye bolt, wherein a diameter of a band of the ring is sized to meet a coupling requirement for a car seat lower anchors and tethers for children (LATCH) system.

15. The bicycle trailer of claim 14, wherein the trailer is collapsible.

16. The bicycle trailer of claim 14, further comprising a bed covering a floor of the trailer.

17. The bicycle trailer of claim 14, wherein the front-facing child's car seat is configured to couple to three latches of the plurality of latches.

\* \* \* \* \*